United States Patent
Neufert et al.

(10) Patent No.: US 6,941,742 B1
(45) Date of Patent: Sep. 13, 2005

(54) METHOD AND DEVICE FOR REDUCING THE NUMBER OF PARTICLES IN AN EXHAUST GAS

(75) Inventors: Ronald Neufert, Michelau (DE); Frank Witzel, Bloomfield Hills, MI (US); Stefan Fischer, Lichtenfels; Günther Pajonk, Zapfendorf, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/568,365

(22) Filed: May 10, 2000

Related U.S. Application Data

(63) Continuation of application No. PCT/DE98/03152, filed on Oct. 28, 1998.

(30) Foreign Application Priority Data

Nov. 10, 1997 (DE) ......................................... 197 49 607

(51) Int. Cl.[7] ............................................... F01N 3/00
(52) U.S. Cl. ............................ 60/274; 60/297; 60/303; 60/311; 423/238; 423/239.1; 423/242.2; 423/244.01
(58) Field of Search .................. 60/274, 286, 299, 60/301, 303, 297, 311; 423/239.1, 239, 242.2, 244.01, 539, 545

(56) References Cited

U.S. PATENT DOCUMENTS

| | | | | |
|---|---|---|---|---|
| 4,029,752 A | * | 6/1977 | Cahn ........................... | 423/563 |
| 4,141,959 A | * | 2/1979 | Kato et al .................... | 423/239 |

(Continued)

FOREIGN PATENT DOCUMENTS

| | | |
|---|---|---|
| DE | 29 19 812 | 11/1980 |
| DE | 36 01 378 A1 | 7/1987 |
| DE | 37 01 527 A1 | 8/1988 |
| DE | 43 10 962 C1 | 2/1994 |
| DE | 195 15 352 A1 | 11/1995 |
| EP | 0 410 440 A1 | 1/1991 |
| EP | 0 611 594 A1 | 8/1994 |

OTHER PUBLICATIONS

Published International Application No. WO 96/36797 (Hofman et al.), dated Nov. 21, 1996, as mentioned on p. 2 of the specification.

Published International Application No. WO 92/17268 (Deeba et al.), dated Oct. 15, 1992.

"$SO_3NH_3$, Wahlco Dual FGC System", Wahlco Environmental Systems Inc., 11/90 edition, pp. 1–4, as mentioned on p. 3 of the specification.

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

To reduce the number of particles in an exhaust gas (A), in particular in the exhaust gas (A) from an internal-combustion engine, sulfur dioxide $SO_2$ which is contained in the exhaust gas (A) is at least partially catalytically oxidized, in the presence of ammonia $NH_3$ in a catalytic converter system having a catalytic activity which increases in the direction of flow, to form sulfur trioxide $SO_3$. The simultaneous presence of sulfur trioxide $SO_3$ and ammonia $NH_3$ in the exhaust-gas stream which is brought about in this way results in an agglomeration of the small and very small particles and reduction in the number thereof.

28 Claims, 1 Drawing Sheet

U.S. PATENT DOCUMENTS

| | | | | |
|---|---|---|---|---|
| 4,272,497 A | * | 6/1981 | Takahashi et al. | 423/239 |
| 4,288,420 A | * | 9/1981 | Ito et al. | 423/239 |
| 4,400,363 A | * | 8/1983 | Grochowski et al. | 423/239 |
| 4,743,436 A | * | 5/1988 | Lyon | 423/235 |
| 4,849,192 A | * | 7/1989 | Lyon | 423/235 |
| 4,853,193 A | * | 8/1989 | Cahn et al. | 423/235 |
| 4,956,161 A | * | 9/1990 | Cahn et al. | 423/235 |
| 5,024,171 A | | 6/1991 | Krigmont et al. | |
| 5,282,355 A | * | 2/1994 | Yamaguchi | 60/39.5 |
| 5,320,052 A | | 6/1994 | Spokoyny et al. | |
| 5,628,186 A | * | 5/1997 | Schmelz | 60/274 |
| 5,809,774 A | * | 9/1998 | Peter-Hoblyn et al. | 60/274 |
| 5,900,222 A | * | 5/1999 | Ito et al. | 423/239.2 |
| 6,003,303 A | * | 12/1999 | PeterHoblyn et al. | 60/274 |
| 6,051,040 A | * | 4/2000 | Peter-Hoblyn | 44/358 |
| 6,105,365 A | * | 8/2000 | Deeba et al. | 60/274 |

* cited by examiner

METHOD AND DEVICE FOR REDUCING THE NUMBER OF PARTICLES IN AN EXHAUST GAS

CROSS-REFERENCE TO RELATED APPLICATION

This is a continuation of copending International Application PCT/DE98/03152, filed Oct. 28, 1998, which designated the United States.

BACKGROUND OF THE INVENTION

Field of the Invention

The invention relates to a method and a device for reducing the number of particles in an exhaust gas formed during the combustion of a fuel, in particular in the exhaust gas from an internal-combustion engine.

The exhaust gas which is formed during the combustion of a fossil, organic fuel generally contains organic particles (soot) and inorganic particles (ash) of different sizes. Soot particles are formed in the event of incomplete combustion or thermal cleavage during the combustion of carbon-containing substances, in particular in the combustion of diesel fuel in badly adjusted diesel engines or as chimney soot at fireplaces.

To reduce the levels of nitrogen oxide contained in the exhaust gas from an internal-combustion engine, particularly in the case of internal-combustion engines which are operated with excess air, the selective catalytic reduction (SCR) process has proven particularly useful. In this process, the nitrogen oxides are reacted with ammonia on a catalytic converter to form nitrogen and water. The ammonia which is required for this purpose is preferably transported in liquid form, as an aqueous urea solution, in the vehicle. From this aqueous urea solution, the ammonia is generated by hydrolysis in a hydrolysis catalytic converter in each case in the particular quantities required at that time for conversion of the nitrogen oxides.

The aqueous urea solution is mixed with compressed air in a mixing chamber, for example in a manner which is known from published PCT application WO 96/36797. The urea solution is then injected into the exhaust-gas flow via an atomizer nozzle arranged in the exhaust-gas flow.

Furthermore, it is known from German published patent application DE 43 10 962 to use an oxidation catalytic converter, in which carbon monoxide and hydrocarbons contained in the exhaust gas are oxidized to form carbon dioxide or carbon dioxide and water, following an SCR catalytic converter, in order to reduce the levels of organic pollutant fractions contained in the exhaust gas.

The advantageous effects of the presence of sulfur trioxide $SO_3$ and ammonia $NH_3$ through the formation of ammonium bisulfate are known, for example, from the company brochure "Wahlco Dual Flue Gas Conditioning System" produced by Wahlco Environmental Systems, Inc., Santa Ana, Calif., November 1990 edition. In that document, sulfur trioxide $SO_3$ and ammonia $NH_3$ are injected into the exhaust gas in order to increase the efficiency of electrostatic soot or ash separators. This so-called "Dual Conditioning" means that an effective level of separation is ensured in the electrostatic separator even under difficult operating conditions, for example if there is a high carbon content in the ash. The properties of sulfur trioxide which are favorable for the separation level of electrostatically operating separators are also known, for example, from U.S. Pat. Nos. 5,024,171 and 5,320,052; in the first of these patents, the injection of ammonia serves primarily to remove excess sulfur trioxide $SO_3$ which is formed during the sulfur dioxide conditioning.

To reduce the levels of particle emissions, it is in principle known to use filters. The particles are trapped in such filters, which are designed as purely mechanical separators or, in large installations, as electrostatic separators. Owing to their limited capacity for trapping particles these filters have to be emptied or regenerated at regular intervals and the solid material which has been separated out has to be disposed of. In the case of soot, this may, for example, be achieved by post-combustion. In addition, filtering processes run the constant risk of becoming blocked. Furthermore, the properties required for a filter in the exhaust-gas flow, namely a high level of separation, a high capacity to trap particles, and a low flow resistance are only technically achievable at the same time with a high level of outlay.

SUMMARY OF THE INVENTION

It is accordingly an object of the invention to provide a method and device for reducing the number of particles in an exhaust gas formed during the combustion of a fuel, that overcome the above-mentioned disadvantages of the prior art devices and methods of this general type, and which is technically not complex and is reliable, i.e. enables the number of particles to be reduced efficiently with little outlay on maintenance.

With the foregoing and other objects in view there is provided, in accordance with the invention, a method for reducing the number of particles in an exhaust gas formed during the combustion of a fuel, comprising the steps of providing an exhaust gas containing sulfur dioxide and particles having a first average particle diameter, admixing ammonia with the exhaust gas, and flowing the mixture of ammonia and exhaust gas through a catalytic converter system having oxidation activity such that the catalytic activity increases, in terms of the oxidation of sulfur dioxide $SO_2$, in the direction of flow, whereby sulfur dioxide is at least in part catalytically oxidized to form sulfur trioxide, and ammonia and sulfur trioxide interact on the surface of particles, leading to agglomeration of the particles and affording exhaust gas with diminished content of sulfur oxides and particles diminished in number and having a second average particle diameter greater than said first average particle diameter.

The exhaust gas formed during the combustion of a fuel is in particular the exhaust gas from an internal-combustion engine.

The simultaneous presence of sulfur trioxide $SO_3$ and ammonia $NH_3$ in the exhaust-gas flow which is brought about in this way results in agglomeration of the small and very small particles. This is because acidic sulfur trioxide $SO_3$ and basic ammonia $NH_3$ become attached to the surface of the particles. The associated electrostatic or chemical interaction of the adsorbates formed during the attachment or adsorption leads to increased agglomeration. The formation of ammonium bisulfate $NH_4HSO_4$ and/or ammonium sulfate $(NH_4)_2SO_4$ which also takes place on the surface of the particles contributes to additional bonding of the particles.

It has been found that the toxicity of the particles contained in the exhaust gas depends, inter alia, on the size of the particles. The size of the particles has a substantial influence on the function of the lungs and the toxic effects associated with intake in the lungs. In other words, the toxic effect of the particles decreases as the size of the particles increases.

Moreover, the invention makes use of the fact that both ammonia $NH_3$ and sulfur dioxide $SO_2$ are contained in sufficient quantities in the exhaust gas from an internal-combustion engine which is run in particular on diesel fuel and downstream of which there is a catalytic converter operated with ammonia $NH_3$ as the reducing agent for the selective reduction of nitrogen oxide $NO_x$.

In an advantageous configuration of the method, the catalytic converter system therefore comprises an SCR catalytic converter in which the exhaust gas is subjected to an SCR process. As a result, the presence of ammonia $NH_3$ in the exhaust gas is ensured from the outset.

In a further advantageous configuration, the catalytic converter system comprises an oxidation catalyst which is separate from, in particular connected downstream of, the SCR catalytic converter and in which the oxidation of the sulfur dioxide $SO_2$ takes place. As a result of this procedure, it is possible for existing exhaust-gas cleaning installations which are equipped with a controlled diesel catalytic converter to be retrofitted easily and at low cost.

To reduce the number of catalytic converters which are required in the catalytic converter system, in an alternative configuration the oxidation of the sulfur dioxide $SO_2$ takes place in a partial area, which is situated in particular on the outlet side in the SCR catalytic converter, of the SCR catalytic converter.

The catalytic converter system preferably contains, as the catalytically active component used for the oxidation of the sulfur dioxide $SO_2$, at least one element selected from the group consisting of Pt, Pd, Rh, Ir, Au, Ag, Ru.

In an alternative configuration, the catalytic converter system contains, as the catalytically active component used for the oxidation of the sulfur dioxide, at least one oxide or mixed oxide of an element selected from the group consisting of the transition metals or the lanthanides or the actinides.

In a particularly preferred configuration of the method according to the invention, the catalytically active component used for the oxidation of the sulfur dioxide is vanadium V or a compound which contains vanadium V.

In particular, the catalytic converter system contains, as a promoter used for the oxidation of the sulfur dioxide $SO_2$, at least one compound containing an alkali metal or alkaline-earth metal.

With the above object in view, there is also provided in accordance with the invention a method for reducing the number of particles in an exhaust gas formed during the combustion of a fuel, in particular in the exhaust gas from an internal-combustion engine, wherein the gas contacts a device for admixing ammonia to the exhaust gas and a device having a catalytic converter system disposed in an exhaust pipe, for at least partial catalytic oxidation of sulfur dioxide $SO_2$ to form sulfur trioxide $SO_3$, with a catalytic activity which increases in the direction of flow.

The latter device comprises a catalytic converter system within an exhaust pipe, for at least partial oxidation of sulfur dioxide $SO_2$ to form sulfur trioxide $SO_3$, with a catalytic activity for the oxidation of the sulfur dioxide $SO_2$ which increases in the direction of flow, and a device for admixing ammonia to the exhaust gas.

In particular, the catalytic converter system contains an SCR catalytic converter which, at least in a partial area, is fitted as an oxidation catalytic converter for oxidation of sulfur dioxide $SO_2$.

In particular, the partial area is located on the outlet side in the SCR catalytic converter, since the oxidation catalytic converter used for the catalytic oxidation of the sulfur dioxide $SO_2$ would also promote the catalytic oxidation of ammonia $NH_3$, so that the latter would no longer be available for the SCR process.

In an alternative embodiment, the catalytic converter system comprises an oxidation catalytic converter which is separate from the SCR catalytic converter. This allows simple retrofitting of exhaust-gas cleaning installations which already comprise an SCR catalytic converter.

Other features which are considered as characteristic for the invention are set forth in the appended claims.

Although the invention is illustrated and described herein as embodied in a method and device for reducing the number of particles in an exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
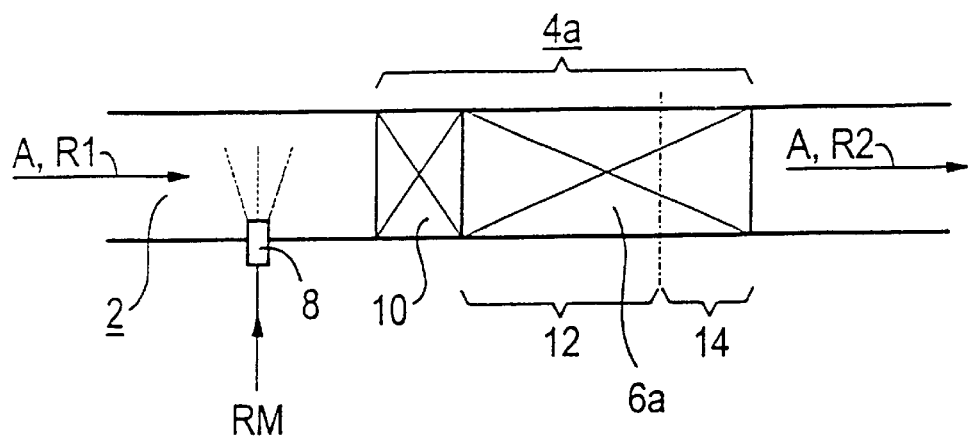
FIGS. 1 and 2 each show a diagrammatic, outline illustration of an exemplary embodiment of the invention.

In accordance with FIG. 1, exhaust gas A which is formed during the combustion of a fuel which contains sulfur S is guided inside an exhaust pipe 2. The sulfur dioxide $SO_2$ which is formed in the exhaust gas A as a result of the combustion of the sulfur flows through a catalytic converter system 4 which comprises an SCR catalytic converter 6a. The SCR catalytic converter 6a is used both for oxidation of the sulfur dioxide $SO_2$ to form sulfur trioxide $SO_3$ and for the selective catalytic reduction of nitrogen oxide $NO_x$ contained in the exhaust gas A. The reducing agent RM, which contains ammonia $NH_3$ required for the reduction of the nitrogen oxides $NO_x$, which in the exemplary embodiment is aqueous urea solution, is introduced into the exhaust pipe 2 upstream of the SCR catalytic converter 6a, as seen in the direction of flow of the exhaust gas A, and is mixed with the exhaust gas A. In the exemplary embodiment, an atomizer nozzle 8 is provided for this purpose, by means of which the aqueous urea solution is injected into the exhaust gas flow as a fine mist. The urea is hydrolyzed in a hydrolysis catalytic converter 10 connected upstream of the SCR catalytic converter, so that gaseous ammonia $NH_3$ is formed, which serves as a reducing agent for the SCR-process to be carried out in the SCR catalytic converter 6a.

The SCR catalytic converter 6a comprises two partial areas 12, 14, the chemical compositions of which differ in terms of the catalytically active substances. In an inlet-side or front partial area 12, the catalytic converter contains, as the catalytically active components, 70–95% by weight titanium dioxide $TiO_2$, 2–10% by weight tungsten oxide $WO_3$ or molybdenum oxide $MoO_3$, 0–2% vanadium pentoxide $V_2O_5$, 0.1–6% by weight aluminum oxide $Al_2O_3$ and 0.1–6% by weight silicon dioxide $SiO_2$. In the outlet-side or rear partial area 14, the vanadium pentoxide concentration is higher, being approximately 4% by weight in the exemplary embodiment. The vanadium pentoxide has a significant influence on the catalytic activity of the SCR catalytic converter 6a with regard to the conversion of sulfur dioxide $SO_2$ to sulfur trioxide $SO_3$. The BET surface areas of the SCR catalytic converter 6a are between 30 and 150 m²/g. Its pore volume, measured using the mercury penetration method, is between 100 and 1000 ml/g, with a monomodal or polymodal pore radius distribution.

It is essential that the vanadium pentoxide concentration in the inlet-side partial-area 12 be lower than in the outlet-side partial area 14, so that the catalytic activity in terms of the oxidation of the sulfur dioxide $SO_2$ increases in the direction of flow. Moreover, an alkali metal or an alkaline-earth metal or a compound containing an alkali metal or an alkaline-earth metal, in the exemplary embodiment 5% by weight of potassium sulfate $K_2SO_4$, is added as a promoter to the partial area 14 in order to increase this catalytic activity.

The BET surface areas of the SCR catalytic converter 6a are between 30 and 150 m²/g. Its pore volume, measured using the mercury penetration method, is between 100 and 1000 ml/g, with a monomodal or polymodal pore radius distribution.

The base substance for the SCR catalytic converter 6a is produced by mixing, milling and kneading of the oxides or their precursor compounds, if appropriate with the addition of customary ceramic auxiliaries and fillers. This base substance is either processed into solid extrudates or is used to coat ceramic or metallic supports in honeycomb or plate form. The catalytic converter 6a is then present in the form of an intermediate. The partial area 14 which is provided for sulfur dioxide oxidation is then produced by partially impregnating the intermediate in a solution containing the component which has a catalytic activity for the sulfur dioxide oxidation, in the exemplary embodiment vanadium pentoxide $V_2O_5$. After drying at 20–100° C., calcining then takes place in the temperature range between 200 and 800° C.

In a further embodiment, the partial area 14 of the SCR catalytic converter contains at least one of the transition metals platinum Pt, palladium Pd, rhodium Rh, iridium Ir, gold Au, silver Ag or ruthenium Ru preferably 2 g of platinum Pt per liter of catalytic converter volume. Moreover, 0–100% by weight of an alkali metal or alkaline-earth metal or of an alkali metal compound or alkaline-earth metal compound or of a mixture thereof, for example 5% by weight of potassium sulfate $K_2SO_4$, is added in the partial area 14 as a promoter.

In the exemplary embodiment, the catalytic activity of the sulfur dioxide $SO_2$ for the oxidation increases suddenly at the boundary between the two partial areas 12 and 14. In an alternative embodiment, instead of a sudden change in the vanadium pentoxide content, this content is increased continuously over the entire length of the SCR catalytic converter, so that the catalytic activity with regard to the sulfur dioxide oxidation increases continuously in the direction of flow of the exhaust gas A. In an alternative embodiment of this nature, the SCR catalytic converter therefore does not comprise adjoining partial areas 12 and 14, at the boundary between which the composition changes suddenly.

As a result of the oxidation of the sulfur dioxide $SO_2$ to form sulfur trioxide $SO_3$ which takes place in the outlet-side partial area 14, the small and very small particles agglomerate to form larger pieces. This is caused by an attachment of acidic sulfur trioxide $SO_3$ and basic ammonia $NH_3$ to the surface of the particles, which, owing to the electrostatic or chemical interaction of the adsorbates and due to the formation of ammonium bisulfate $NH_4HSO_4$ or ammonium sulfate $(NH_4)_2SO_4$, become joined together. In other words, the exhaust gas A, upstream of the catalytic converter arrangement 4 as seen in the direction of flow, contains particles R1 which on average have a smaller diameter than the particles R2 contained in the exhaust gas A downstream of the catalytic converter arrangement 4 as seen in the direction of flow. This increase in the mean size of the particles consequently also leads to a reduction in the number of particles.

Moreover, the presence of the partial area 14 which has a higher catalytic activity with regard to the oxidation action reduces the levels of hydrocarbons which remain behind in the exhaust gas A in the incomplete combustion process, even if they are situated on the particles R1. Since ammonia $NH_3$ becomes attached to the particles R1, moreover, the amount of excess ammonia $NH_3$ in the exhaust gas, i.e. the ammonia slip, is reduced.

Figure 2:
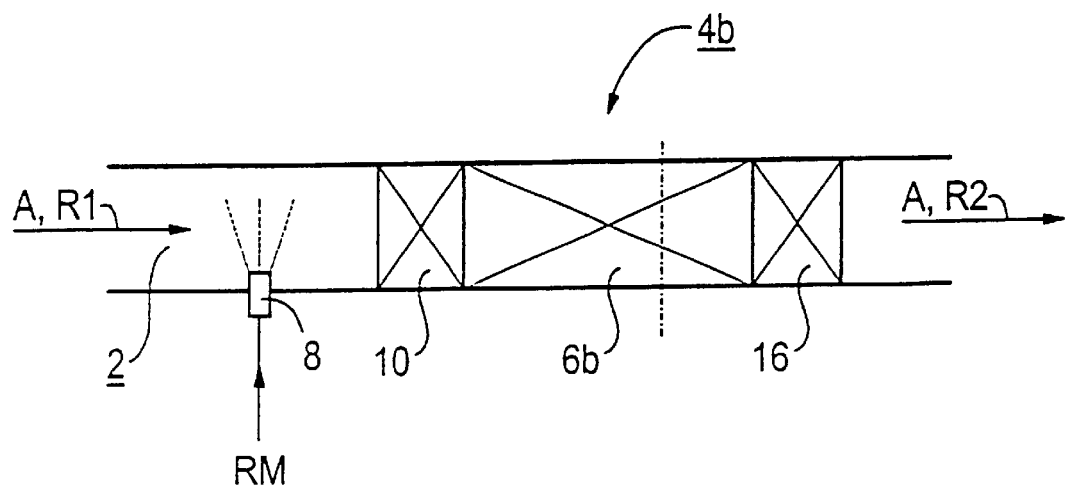

In accordance with FIG. 2, in an alternative configuration of the device, a catalytic converter system 4b is provided, in which, in addition to a pure SCR catalytic converter 6b, which is provided only for the catalytic reduction of nitrogen oxides $NO_x$, there is also an oxidation catalytic converter 16, which is formed spatially and structurally separate from the SCR catalytic converter, i.e. as a structurally separate unit, and can have the same composition as the partial area 14 in the exemplary embodiment shown in FIG. 1. This makes it easy to retrofit exhaust-gas cleaning installations in which a conventional SCR catalytic converter is already fitted.

We claim:

1. A method of reducing a number of particles in an exhaust gas formed during a combustion of a fuel, which comprises the steps of providing an exhaust gas containing sulfur dioxide and particles having a first average particle diameter, admixing ammonia with the exhaust gas, and flowing the mixture of ammonia and exhaust gas through a catalytic converter system having oxidation activity such that the catalytic activity increases, in terms of the oxidation of sulfur dioxide $SO_2$, in the direction of flow, whereby sulfur dioxide is at least in part catalytically oxidized to form sulfur trioxide and ammonia and sulfur trioxide interact on a particle surface, leading to agglomeration of the particles and affording exhaust gas with diminished content of sulfur oxides and particles diminished in number and having a second average particle diameter greater than said first average particle diameter.

2. The method according to claim 1, which comprises forming the exhaust gas by combustion in an internal-combustion engine.

3. The method according to claim 1, wherein the exhaust gas additionally contains nitrogen oxides and the catalytic converter system comprises an SCR catalytic converter containing an SCR catalyst, and the method further comprises subjecting the exhaust gas to an SCR process.

4. The method according to claim 3, wherein the oxidation of the sulfur dioxide $SO_2$ takes place at least in a partial area in the SCR catalytic converter.

5. The method according to claim 4, wherein the partial area is located on the outlet side in the SCR catalytic converter.

6. The method according to claim 3, wherein the SCR catalytic converter is separate from the oxidation catalytic converter in which the oxidation of the sulfur dioxide $SO_2$ takes place.

7. The method according to claim 6, wherein the oxidation catalytic converter is connected downstream of the SCR catalytic converter.

8. The method according to claim 7, which comprises adding the oxidation catalytic converter to retrofit an exhaust-gas cleaning installation including a conventional SCR catalytic converter.

9. The method according to claim 3, wherein the SCR catalyst has BET surface area between 30 and 150 m²/g.

10. The method according to claim 3, wherein the SCR catalyst has a pore volume between 100 and 1000 ml/g.

11. The method according to claim 1, wherein the catalytic converter system contains, as the catalytically active component used for oxidizing the sulfur dioxide $SO_2$, at least one element selected from the group consisting of Pt, Pd, Rh, Ir, Au, Ag, Ru.

12. The method according to claim 1, wherein the catalytic converter system contains, as the catalytically active component used for the oxidation of the sulfur dioxide $SO_2$, at least one oxide or mixed oxide of an element selected from the group consisting of transition metal, lanthanide and actinide elements.

13. The method according to claim 1, wherein the catalytic converter system contains, as the catalytically active component used for oxidizing the sulfur dioxide $SO_2$, vanadium or a compound containing vanadium.

14. The method according to claim 1, wherein the catalytic converter system additionally contains at least one promoter for the oxidation of the sulfur dioxide $SO_2$ selected from the group consisting of alkali metals, alkaline-earth metals, and compounds thereof.

15. A method for reducing the number of particles in an exhaust gas formed during a combustion of a fuel, which comprises the steps of providing an exhaust gas containing sulfur dioxide and particles having a first average particle diameter, admixing ammonia with the exhaust gas, and flowing the mixture of ammonia and exhaust gas through a catalytic converter system having oxidation activity such that the catalytic activity increases, in terms of the oxidation of sulfur dioxide $SO_2$, in the direction of flow; wherein the exhaust gas additionally contains nitrogen oxides and the catalytic converter system comprises an SCR catalytic converter containing an SCR catalyst, and the method further comprises subjecting the exhaust to an SCR process; and wherein the catalytic converter system comprises an inlet-side partial area in which the catalytically active components consist essentially of 70–95% by weight titanium dioxide $TiO_2$, 2–10% by weight of at least one oxide selected from the group consisting of tungsten oxide $WO_3$ and molybdenum oxide $MoO_3$, 0–2% vanadium pentoxide $V_2O_5$, 0.1–6% by weight aluminum oxide $Al_2O_3$ and 0.1–6% by weight silicon dioxide $SiO_2$, and an outlet-side partial area in which the vanadium pentoxide concentration is greater than in said inlet-side partial area; whereby sulfur dioxide is at least in part catalytically oxidized to form sulfur trioxide and ammonia and sulfur trioxide interact on the surface of particles, leading to agglomeration of the particles and affording exhaust gas with diminished content of sulfur oxides and particles diminished in number and having a second average particle diameter greater than said first average particle diameter.

16. The method according to claim 15, wherein the concentration of vanadium pentoxide in the outlet-side partial area is approximately 4% by weight.

17. A method for reducing the number of particles in an exhaust gas formed during the combustion of a fuel, which comprises contacting an exhaust gas on a device for admixing ammonia to the exhaust gas and a device having a catalytic converter system disposed in an exhaust pipe, at least partially catalytically oxidizing sulfur dioxide $SO_2$ to form sulfur trioxide $SO_3$, with a catalytic activity in terms of the oxidation of sulfur dioxide which increases in a direction of flow.

18. The method according to claim 17, which comprises generating the exhaust gas by fuel combustion in an internal combustion engine.

19. The method according to claim 17, wherein the catalytic converter system comprises an SCR catalytic converter.

20. The method according to claim 17, wherein at least a partial area of the SCR catalytic converter is an oxidation catalytic converter for oxidation of sulfur dioxide $SO_2$ to form sulfur trioxide $SO_3$.

21. The method according to claim 20, wherein the partial area is located on the outlet side in the SCR catalytic converter.

22. The method according to claim 20, wherein the catalytic converter system comprises an oxidation catalytic converter which is separate from the SCR catalytic converter.

23. The method according to claim 17, wherein the catalytic converter system contains, as the catalytically active component for the oxidation of the sulfur dioxide $SO_2$, at least one element selected from the group consisting of Pt, Pd, Rh, Ir, Au, Ag, Ru.

24. The method according to claim 17, wherein the catalytic converter system contains, as the catalytically active component for the oxidation of the sulfur dioxide $SO_2$, at least one oxide of an element selected from the group consisting of the transition metals, the lanthanides, the actinides, and mixtures thereof.

25. The method according to claim 17, wherein the catalytic converter system contains, as the catalytically active component for the oxidation of the sulfur dioxide $SO_2$, vanadium V or a component which contains vanadium V.

26. The method according to claim 17, wherein the catalytic converter system contains at least one promoter for the oxidation of the sulfur dioxide $SO_2$ selected from the group consisting of the alkali metals, the alkaline-earth metals, and compounds thereof.

27. A method for reducing the number of particles in an exhaust gas formed during the combustion of a fuel, which comprises contacting an exhaust gas on a device for admixing ammonia to the exhaust gas and a device having a catalytic converter system disposed in an exhaust pipe, at least partially catalytically oxidizing sulfur dioxide $SO_2$ to form sulfur trioxide $SO_3$, with a catalytic activity in terms of the oxidation of sulfur dioxide which increases in a direction of flow, wherein the catalytic converter system comprises an inlet-side partial area in which the catalytically active components consist essentially of 70–95% by weight titanium dioxide $TiO_2$, 2–10% by weight of at least one oxide selected from the group consisting of tungsten oxide $WO_3$ and molybdenum oxide $MoO_3$, 0–2% vanadium pentoxide $V_2O_5$, 0.1–6% by weight aluminum oxide $Al_2O_3$ and 0.1–6% by weight silicon dioxide $SiO_2$, and an outlet-side partial area in which the vanadium pentoxide concentration is greater than in said inlet-side partial area.

28. The method according to claim 27, wherein the concentration of vanadium pentoxide in the outlet-side partial area is approximately 4% by weight.

* * * * *